US011460295B2

United States Patent
Liu et al.

(10) Patent No.: US 11,460,295 B2
(45) Date of Patent: Oct. 4, 2022

(54) ON-LINE SPACE DETECTION DEVICE FOR WHEEL INNER RIM

(71) Applicant: CITIC Dicastal Co., LTD, Qinhuangdao (CN)

(72) Inventors: Weidong Liu, Qinhuangdao (CN); Fengyan Liu, Qinhuangdao (CN); Jiandong Guo, Qinhuangdao (CN); Bowen Xue, Qinhuangdao (CN); Yao Zheng, Qinhuangdao (CN)

(73) Assignee: CITIC Dicastal Co., LTD, Qinhuangdao (CN)

(*) Notice: Subject to any disclaimer, the term of this patent is extended or adjusted under 35 U.S.C. 154(b) by 506 days.

(21) Appl. No.: 16/550,353

(22) Filed: Aug. 26, 2019

(65) Prior Publication Data

US 2020/0141725 A1 May 7, 2020

(30) Foreign Application Priority Data

Nov. 7, 2018 (CN) .......................... 201811318360.0

(51) Int. Cl.
*G01M 17/013* (2006.01)
*G01B 21/02* (2006.01)
*G06F 3/03* (2006.01)

(52) U.S. Cl.
CPC ........... *G01B 21/02* (2013.01); *G01M 17/013* (2013.01); *G06F 3/0317* (2013.01)

(58) Field of Classification Search
CPC .................................................. G01M 17/013
See application file for complete search history.

(56) References Cited

U.S. PATENT DOCUMENTS

| 11,181,355 | B2* | 11/2021 | Xu | G01B 5/0028 |
|---|---|---|---|---|
| 2018/0003592 | A1* | 1/2018 | Liu | G01M 1/225 |
| 2019/0030664 | A1* | 1/2019 | Liu | B23P 19/027 |
| 2019/0033173 | A1* | 1/2019 | Liu | G01M 1/045 |
| 2019/0351474 | A1* | 11/2019 | Xue | B23B 5/28 |
| 2020/0003539 | A1* | 1/2020 | Xue | B60T 17/221 |
| 2020/0141710 | A1* | 5/2020 | Liu | G01B 5/0025 |
| 2020/0141711 | A1* | 5/2020 | Liu | G01B 21/16 |
| 2020/0141712 | A1* | 5/2020 | Wu | G01B 5/255 |
| 2020/0147663 | A1* | 5/2020 | Xue | B21C 51/00 |
| 2020/0338687 | A1* | 10/2020 | Cai | B24B 29/04 |
| 2021/0088414 | A1* | 3/2021 | Liu | G01M 17/013 |
| 2021/0154715 | A1* | 5/2021 | Guo | B21D 1/02 |
| 2021/0154719 | A1* | 5/2021 | Guo | B21D 53/30 |
| 2022/0097175 | A1* | 3/2022 | Xue | B23K 26/356 |

* cited by examiner

Primary Examiner — Eric S. McCall
(74) Attorney, Agent, or Firm — Yong Chen

(57) ABSTRACT

An on-line space detecting device for wheel inner, which comprises a frame, a servo motor A, a synchronous gear A, a bottom plate, a synchronous belt, a synchronous gear B, a base, a connecting shaft, a servo motor B, a shaft sleeve A, a lower end cap, a connecting shaft B, a shaft sleeve B, an oil cylinder, a bearing A, an end cap, a gland, bearings B, a chassis, a flange, a locating pin, springs, rising flaps, a connecting shaft C, a protection, a rising core etc., the present disclosure can meet the needs of the space detection for wheel inner, and has the characteristics of simple structure, convenient manufacture, stable performance and precision of meeting the processing requirements, and can meet the needs of automatic production.

1 Claim, 1 Drawing Sheet

ON-LINE SPACE DETECTION DEVICE FOR WHEEL INNER RIM

CROSS-REFERENCE TO RELATED APPLICATIONS

The present application claims the priority of Chinese patent application No. 201811318360.0, filed on Nov. 7, 2018, which is hereby incorporated by reference in its entirety.

TECHNICAL FIELD

The present disclosure relates to a space detecting device, and more particularly to an on-line space detecting device for wheel inner rim after completing the wheel machining process.

BACKGROUND

The wheel is mounted on the vehicle by bolts. At the same time, the brake system of the vehicle is mounted inside the wheel inner. The space inside the wheel inner must meet the installation requirements of the brake system. The present disclosure introduces an on-line space detecting device for wheel inner under automated production conditions.

SUMMARY

It is an object of the present disclosure to provide an on-line space detecting device for wheel inner.

In order to achieve the above object, the technical solution of the present disclosure is as follows: an on-line space detecting device for wheel inner, which comprises a frame, a servo motor A, a synchronous gear A, a bottom plate, a synchronous belt, a synchronous gear B, a base, a connecting shaft, a servo motor B, a shaft sleeve A, a lower end cap, a connecting shaft B, a shaft sleeve B, an oil cylinder, a bearing A, an end cap, a gland, bearings B, a chassis, a flange, a locating pin, springs, rising flaps, a connecting shaft C, a protection, a rising core, a probe holder, a probe, a driven pulley A, a drive pulley A, a bracket A, a motor bracket, a servo motor C, a ball screw A, a linear guiding rail A, a guiding rail slide carriage A, a sliding bracket A, a screw nut A, a bracket B, a sliding bracket B, a linear guiding rail B, a bracket C, a guiding rail slide carriage B, a lead screw B, a screw nut B, a support D, a driven pulley B, a servo motor D and an drive pulley B.

The servo motor A and the base are fixed on the frame through the bottom plate; the shaft sleeve A is mounted on the base through the bearing A and the end cap; the output shaft of the servo motor A is connected with the synchronous gear A, the shaft sleeve A is connected to the synchronous gear B through the connecting shaft, and the synchronous gear A and the synchronous gear B are connected by the synchronous belt.

The lower end cap, the chassis and are fixed on the shaft sleeve A, the servo motor B is mounted on the lower end cap, the shaft sleeve B is mounted on the shaft sleeve A through the two rows of bearings B and the gland, the cylinder is fixed inside the shaft sleeve B, the output end of the cylinder is connected to the connecting shaft C, the servo motor B is connected to the shaft sleeve B through the connecting shaft B, and the rising core is connected to the shaft sleeve B through the connecting shaft C. The core, the connecting shaft C and the shaft sleeve B are circumferentially locked without relative rotation. The connecting shaft C and the shaft sleeve B can move relatively axially. The flange is fixed on the chassis, the flange and the inner cavity of the chassis form eight uniformly distributed T-shaped sliding grooves, and the bottom surfaces of the eight rising flaps are the T-shaped structures which are respectively matched with the eight T-shaped sliding grooves one by one. The rising flaps can smoothly and accurately slide in the sliding grooves. The inner side walls of the rising flaps are 15 degrees inclined surfaces. The two ends of the eight springs are respectively connected to the flange and the eight rising flaps. On the side of the rising core there are two sets of uniformly spaced 15 degrees inclined surfaces A and inclined surfaces B, wherein the number of inclined surfaces of each set is eight, and there is a height difference between the two sets of inclined surfaces. The upper end side walls of the two sets of inclined faces meet at the tapered surface. Under the combined action of the pulling force of the oil cylinder and the elastic force of the spring, the side walls of the rising flaps are in contact with the tapered surface of the rising core when the rising core is at the bottom position. The servo motor B drives the rising core to rotate 22.5 degrees via the connecting shaft B, the shaft sleeve B and the connecting shaft C. The rising flaps cooperate with the inclined surfaces to switch between the inclined surfaces A and the inclined surfaces B of the rising core. The oil cylinder drives the connecting shaft C and the rising core to move up and down. Through the cooperation of the rising flaps with the inclined surfaces of the rising core, the eight rising flaps synchronously perform centred motion and centrifugal motion along the eight uniformly distributed T-shaped grooves formed in the chassis and the inner cavity of the flange. The eight rising flaps achieve a high-precision synchronous expansion and contraction function. Due to the height difference between the two sets of uniformly spaced inclined surfaces on the side of the rising core, when the servo motor B drives the rising core to rotate 22.5 degrees, the rising flap cooperates with the inclined surfaces to switch between the inclined surfaces A and the inclined surfaces B of the rising core, so that the expansion and contraction diameters of the rising flaps change in two different ranges, and finally the rising flaps achieve large stroke expansion and contraction.

The linear guiding rail A, the bracket A, the bracket B and the motor bracket are mounted on the sliding bracket B; the servo motor C is mounted on the motor bracket; the sliding bracket A is connected with the linear guiding rail A through the guiding rail slide carriage A; the ball screw A is mounted on the sliding bracket B through the bracket A and the bracket B, and one end of the ball screw A is connected with the driven pulley A; the output shaft of the servo motor C is connected with the drive pulley A; the screw nut A is mounted on the sliding bracket A, and is meshed with the ball screw A. By controlling the steering and the revolution number of the servo motor C, the servo motor C can control the vertical movement of the sliding bracket A along the linear guide A by the transmission mechanism of the synchronous pulley. The probe is mounted on the sliding bracket A through the probe holder.

The linear guiding rail B, the bracket C, the support D and the servo motor D are mounted on the frame; the sliding bracket B is connected with the linear guiding rail B through the guiding rail slide carriage B; the lead screw B is mounted on the frame through the bracket C and the support D, and one end of the lead screw B is connected with the driven pulley B; the output shaft of the servo motor D is connected with the drive pulley B; the screw nut B is mounted on the sliding bracket B, and is meshed with the lead screw B. By controlling the steering and the revolution number of the servo motor D, the servo motor D can control the horizontal movement of the sliding bracket B along the linear guiding rail B by the transmission mechanism of the synchronous pulley.

According to the requirements of the space detection for inner rim specified in the wheel product standard, the control system can synthetically control the steering and the revolution number of the servo motor C and the servo motor D through a pre-programmed running program, and can control the probe to move along the detection space line of the wheel inner.

In actual use, the wheel is transported directly above the present device through the conveyor system. The cylinder rod of the oil cylinder is in a contracted state, and under the action of the spring, the inclined surfaces of the rising flaps are in contact with the upper tapered surface of the rising core. According to the size of the diameter of the center hole of the wheel, the servo motor B drives the rising core to rotate a specific angle, so that the inclined surfaces of the rising flaps are matched with the corresponding inclined surfaces of the rising core. Then the oil cylinder starts to work, and the cylinder drives the connecting shaft C and the rising core move upward against the elastic force of the spring. Each of the rising flaps, through the cooperation of the rising flaps with the inclined surfaces of the rising core, synchronously move outwardly along the eight uniformly distributed T-shaped grooves formed in the rising flaps and the inner cavity of the flange, finally the rising flaps contact the center hole of the wheel, and the positioning and tightening process of the wheel is completed. According to the requirements of the space detection for wheel inner rim, the wheel detection program is pre-programmed. The control system of the device can synthetically control the steering and the revolution number of the servo motor C and the servo motor D through the space detection program input in advance, and can control the probe to move along the detection space line of the wheel inner. The probe synchronously feeds back the distance information between the wheels to the analysis system of the device, and the analysis system compares the acquired information with the requirements of the wheel product standard, and determines whether the wheel assembly space is qualified. At this point, the assembly space detection work of the wheel is completed.

The present disclosure can meet the needs of the space detection for wheel inner, and has the characteristics of simple structure, convenient manufacture, stable performance and precision of meeting the processing requirements, and can meet the needs of automatic production.

DETAILED DESCRIPTION

Figure 1:
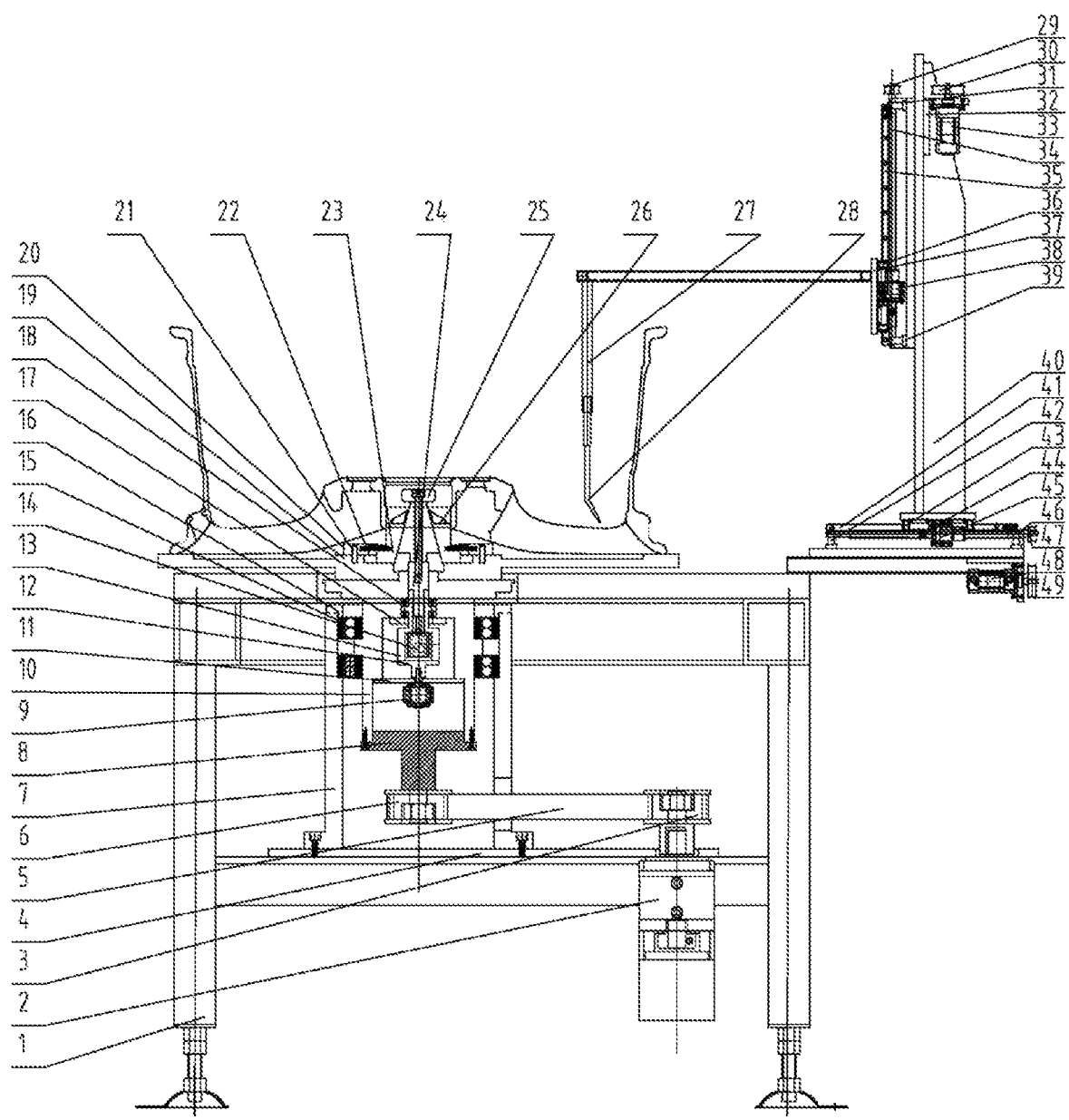
FIG. 1 is the schematic structure diagram of the on-line space detecting device for wheel inner of the present disclosure.
Figure 2:
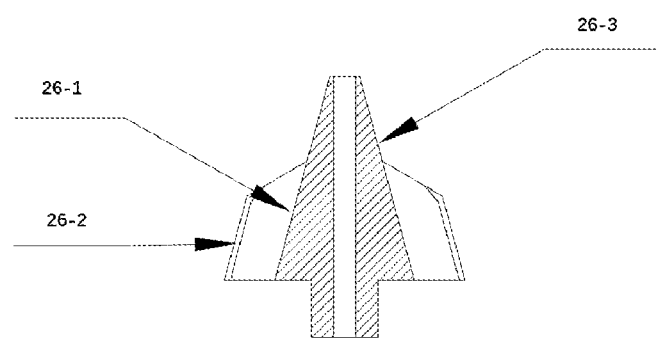
FIG. 2 is the schematic diagram of the rising core of on-line space detecting device for wheel inner.

The details and operation of the specific device proposed in accordance with the present disclosure will be described in detail below with reference to the accompanying drawings.

The disclosure relates to an on-line space detecting device for wheel inner, which comprises a frame 1, a servo motor 2, a synchronous gear 3, a bottom plate 4, a synchronous belt 5, a synchronous gear 6, a base 7, a connecting shaft 8, a servo motor 9, a shaft sleeve 10, a lower end cap 11, a connecting shaft 12, a shaft sleeve 13, an oil cylinder 14, a bearing 15, an end cap 16, a gland 17, bearings 18, a chassis 19, a flange 20, a locating pin 21, springs 22, rising flaps 23, a connecting shaft 24, a protection 25, a rising core 26, a probe holder 27, a probe 28, a driven pulley 29, a drive pulley 30, a bracket 31, a motor bracket 32, a servo motor 33, a ball screw 34, a linear guiding rail 35, a guiding rail slide carriage 36, a sliding bracket 37, a screw nut 38, a bracket 39, a sliding bracket 40, a linear guiding rail 41, a bracket 42, a guiding rail slide carriage 43, a lead screw 44, a screw nut 45, a support 46, a driven pulley 47, a servo motor 48 and an drive pulley 49.

The servo motor 2 and the base 7 are fixed on the frame 1 through the bottom plate 4; the shaft sleeve 10 is mounted on the base 7 through the bearing 15 and the end cap 16; the output shaft of the servo motor 2 is connected with the synchronous gear 3, the shaft sleeve 10 is connected to the synchronous gear 6 through the connecting shaft 8, and the synchronous gear 3 and the synchronous gear 6 are connected by the synchronous belt 5.

The lower end cap 11, the chassis 19 and 17 are fixed on the shaft sleeve 10, the servo motor 9 is mounted on the lower end cap 11, the shaft sleeve 13 is mounted on the shaft sleeve 10 through the two rows of bearings 18 and the gland 17, the cylinder 14 is fixed inside the shaft sleeve 21, the output end of the cylinder 14 is connected to the connecting shaft 24, the servo motor 9 is connected to the shaft sleeve 13 through the connecting shaft 12, and the rising core 26 is connected to the shaft sleeve 13 through the connecting shaft 24. The core 26, the connecting shaft 24 and the shaft sleeve 13 are circumferentially locked without relative rotation. The connecting shaft 24 and the shaft sleeve 13 can move relatively axially. The flange 20 is fixed on the chassis 19, the flange 20 and the inner cavity of the chassis 19 form eight uniformly distributed T-shaped sliding grooves, and the bottom surfaces of the eight rising flaps 23 are the T-shaped structures which are respectively matched with the eight T-shaped sliding grooves one by one. The rising flaps 23 can smoothly and accurately slide in the sliding grooves. The inner side walls of the rising flaps 23 are 15 degrees inclined surfaces. The two ends of the eight springs 22 are respectively connected to the flange 20 and the eight rising flaps 23. On the side of the rising core 26 there are two sets of uniformly spaced 15 degrees inclined surfaces 26-1 and inclined surfaces 26-2, wherein the number of inclined surfaces of each set is eight, and there is a height difference between the two sets of inclined surfaces. The upper end side walls of the two sets of inclined faces meet at the tapered surface 26-3. Under the combined action of the pulling force of the oil cylinder 14 and the elastic force of the spring 22, the side walls of the rising flaps 23 are in contact with the tapered surface 26-3 of the rising core 26 when the rising core 26 is at the bottom position. The servo motor 9 drives the rising core 26 to rotate 22.5 degrees via the connecting shaft 12, the shaft sleeve 13 and the connecting shaft 24. The rising flaps 23 cooperate with the inclined surfaces to switch between the inclined surfaces 26-1 and the inclined surfaces 26-2 of the rising core 26. The oil cylinder 14 drives the connecting shaft 32 and the rising core 26 to move up and down. Through the cooperation of the rising flaps 23 with the inclined surfaces of the rising core 26, the eight rising flaps 23 synchronously perform centred motion and centrifugal motion along the eight uniformly distributed T-shaped grooves formed in the chassis 19 and the inner cavity of the flange 20. The eight rising flaps 23 achieve a high-precision synchronous expansion and contraction function. Due to the height difference between the two sets of uniformly spaced inclined surfaces on the side of the rising core 26, when the servo motor 9 drives the rising core 26 to rotate 22.5 degrees, the rising flap 23 cooperates with the inclined surfaces to switch between the inclined surfaces 26-1 and the inclined surfaces 26-2 of the rising core 26, so that the expansion and contraction diameters of the rising flaps 23 change in two different ranges, and finally the rising flaps 23 achieve large stroke expansion and contraction.

The linear guiding rail 35, the bracket 31, the bracket 39 and the motor bracket 32 are mounted on the sliding bracket 40; the servo motor 33 is mounted on the motor bracket 32; the sliding bracket 37 is connected with the linear guiding rail 35 through the guiding rail slide carriage 36; the ball screw 34 is mounted on the sliding bracket 40 through the bracket 31 and the bracket 39, and one end of the ball screw 34 is connected with the driven pulley 29; the output shaft of the servo motor 33 is connected with the drive pulley 30; the screw nut 38 is mounted on the sliding bracket 37, and is meshed with the ball screw 34. By controlling the steering and the revolution number of the servo motor 33, the servo motor 33 can control the vertical movement of the sliding bracket 37 along the linear guide 35 by the transmission mechanism of the synchronous pulley. The probe 28 is mounted on the sliding bracket 37 through the probe holder 27.

The linear guiding rail 41, the bracket 42, the support 46 and the servo motor 48 are mounted on the frame 1; the sliding bracket 40 is connected with the linear guiding rail 41 through the guiding rail slide carriage 43; the lead screw 44 is mounted on the frame 1 through the bracket 42 and the support 46, and one end of the lead screw 44 is connected with the driven pulley 47; the output shaft of the servo motor 48 is connected with the drive pulley 49; the screw nut 45 is mounted on the sliding bracket 40, and is meshed with the lead screw 44. By controlling the steering and the revolution number of the servo motor 48, the servo motor 48 can control the horizontal movement of the sliding bracket 40 along the linear guiding rail 41 by the transmission mechanism of the synchronous pulley.

According to the requirements of the space detection for inner rim specified in the wheel product standard, the control system can synthetically control the steering and the revolution number of the servo motor 33 and the servo motor 48 through a pre-programmed running program, and can control the probe 28 to move along the detection space line of the wheel inner.

In actual use, the wheel is transported directly above the present device through the conveyor system. The cylinder rod of the oil cylinder 14 is in a contracted state, and under the action of the spring 22, the inclined surfaces of the rising flaps 23 are in contact with the upper tapered surface of the rising core 26. According to the size of the diameter of the center hole of the wheel, the servo motor 9 drives the rising core 26 to rotate a specific angle, so that the inclined surfaces of the rising flaps 23 are matched with the corresponding inclined surfaces of the rising core 26. Then the oil cylinder 14 starts to work, and the cylinder 14 drives the connecting shaft 24 and the rising core 26 move upward against the elastic force of the spring 22. Each of the rising flaps 23, through the cooperation of the rising flaps with the inclined surfaces of the rising core 26, synchronously move outwardly along the eight uniformly distributed T-shaped grooves formed in the rising flaps 23 and the inner cavity of the flange 20, finally the rising flaps 23 contact the center hole of the wheel, and the positioning and tightening process of the wheel is completed. According to the requirements of the space detection for wheel inner rim, the wheel detection program is pre-programmed. The control system of the device can synthetically control the steering and the revolution number of the servo motor 33 and the servo motor 48 through the space detection program input in advance, and can control the probe 28 to move along the detection space line of the wheel inner. The probe 28 synchronously feeds back the distance information between the wheels to the analysis system of the device, and the analysis system compares the acquired information with the requirements of the wheel product standard, and determines whether the wheel assembly space is qualified. At this point, the assembly space detection work of the wheel is completed.

What is claimed is:

1. An on-line space detecting device for wheel inner, which comprises a frame, a servo motor A, a synchronous gear A, a bottom plate, a synchronous belt, a synchronous gear B, a base, a connecting shaft, a servo motor B, a shaft sleeve A, a lower end cap, a connecting shaft B, a shaft sleeve B, an oil cylinder, a bearing A, an end cap, a gland, bearings B, a chassis, a flange, a locating pin, springs, rising flaps, a connecting shaft C, a protection, a rising core, a probe holder, a probe, a driven pulley A, a drive pulley A, a bracket A, a motor bracket, a servo motor C, a ball screw A, a linear guiding rail A, a guiding rail slide carriage A, a sliding bracket A, a screw nut A, a bracket B, a sliding bracket B, a linear guiding rail B, a bracket C, a guiding rail slide carriage B, a lead screw B, a screw nut B, a support D, a driven pulley B, a servo motor D and an drive pulley B, characterized in that the servo motor A and the base are fixed on the frame through the bottom plate; the shaft sleeve A is mounted on the base through the bearing A and the end cap; the output shaft of the servo motor A is connected with the synchronous gear A, the shaft sleeve A is connected to the synchronous gear B through the connecting shaft, and the synchronous gear A and the synchronous gear B are connected by the synchronous belt, the lower end cap, the chassis and are fixed on the shaft sleeve A, the servo motor B is mounted on the lower end cap, the shaft sleeve B is mounted on the shaft sleeve A through the two rows of bearings B and the gland, the cylinder is fixed inside the shaft sleeve B, the output end of the cylinder is connected to the connecting shaft C, the servo motor B is connected to the shaft sleeve B through the connecting shaft B, and the rising core is connected to the shaft sleeve B through the connecting shaft C, the core, the connecting shaft C and the shaft sleeve B are circumferentially locked without relative rotation, the connecting shaft C and the shaft sleeve B can move relatively axially, the flange is fixed on the chassis, the flange and the inner cavity of the chassis form eight uniformly distributed T-shaped sliding grooves, and the bottom surfaces of the eight rising flaps are the T-shaped structures which are respectively matched with the eight T-shaped sliding grooves one by one, the rising flaps can smoothly and accurately slide in the sliding grooves, the inner side walls of the rising flaps are 15 degrees inclined surfaces, the two ends of the eight springs are respectively connected to the flange and the eight rising flaps, on the side of the rising core there are two sets of uniformly spaced 15 degrees inclined surfaces A—and inclined surfaces B—, wherein the number of inclined surfaces of each set is eight, and there is a height difference between the two sets of inclined surfaces, the upper end side walls of the two sets of inclined faces meet at the tapered surface, under the combined action of the pulling force of the oil cylinder and the elastic force of the spring, the side walls of the rising flaps are in contact with the tapered surface—of the rising core when the rising core is at the bottom position, the servo motor B drives the rising core to rotate 22.5 degrees via the connecting shaft B, the shaft sleeve B and the connecting shaft C, the rising flaps cooperate with the inclined surfaces to switch between the inclined surfaces A—and the inclined surfaces B—of the rising core, the oil cylinder drives the connecting shaft C and the rising core to move up and down, through the cooperation of the rising flaps with the inclined surfaces of the rising core, the eight rising flaps synchronously perform centred motion and centrifugal motion along the eight uniformly distributed T-shaped grooves formed in the chassis and the inner cavity of the flange, the eight rising flaps achieve a high-precision synchronous expansion and contraction function, wherein due to the height difference between the two sets of uniformly spaced inclined surfaces on the side of the rising core, when the servo motor B drives the rising core to rotate 22.5 degrees, the rising flap cooperates with the inclined surfaces to switch between the inclined surfaces A—and the inclined surfaces B—of the rising core, so that the expansion and contraction diameters of the rising flaps change in two different ranges, and finally the rising flaps achieve large stroke expansion and contraction, the linear guiding rail A, the bracket A, the bracket B and the motor bracket are mounted on the sliding bracket B; the servo motor C is mounted on the motor bracket; the sliding bracket A is connected with the linear guiding rail A through the guiding rail slide carriage A; the ball screw A is mounted on the sliding bracket B through the bracket A and the bracket B, and one end of the ball screw A is connected with the driven pulley A; the output shaft of the servo motor C is connected with the drive pulley A; the screw nut A is mounted on the sliding bracket A, and is meshed with the ball screw A wherein by controlling the steering and the revolution number of the servo motor C, the servo motor C can control the vertical movement of the sliding bracket A along the linear guide A by the transmission mechanism of the synchronous pulley, the probe is mounted on the sliding bracket A through the probe holder, the linear guiding rail B, the bracket C, the support D and the servo motor D are mounted on the frame; the sliding bracket B is connected with the linear guiding rail B through the guiding rail slide carriage B; the lead screw B is mounted on the frame through the bracket C and the support D, and one end of the lead screw B is connected with the driven pulley B; the output shaft of the servo motor D is connected with the drive pulley B; the screw nut B is mounted on the sliding bracket B, and is meshed with the lead screw B wherein by controlling the steering and the revolution number of the servo motor D, the servo motor D can control the horizontal movement of the sliding bracket B along the linear guiding rail B by the transmission mechanism of the synchronous pulley, according to the requirements of the space detection for inner rim specified in the wheel product standard, the control system can synthetically control the steering and the revolution number of the servo motor C and the servo motor D through a pre-programmed running program, and can control the probe to move along the detection space line of the wheel inner.

\* \* \* \* \*